(12) United States Patent
Yano et al.

(10) Patent No.: US 9,056,969 B2
(45) Date of Patent: Jun. 16, 2015

(54) COMPOSITION CONTAINING MICROFIBRILLATED PLANT FIBERS

(75) Inventors: Hiroyuki Yano, Uji (JP); Katsuhito Suzuki, Kyoto (JP); Akihiro Sato, Kyoto (JP)

(73) Assignees: NIPPON PAPER INDUSTRIES CO., LTD., Tokyo (JP); DIC Corporation, Tokyo (JP); Seiko PMC Corporation, Tokyo (JP); Kyoto University, Kyoto-shi (JP)

( * ) Notice: Subject to any disclaimer, the term of this patent is extended or adjusted under 35 U.S.C. 154(b) by 221 days.

(21) Appl. No.: 13/502,581

(22) PCT Filed: Oct. 21, 2010

(86) PCT No.: PCT/JP2010/068565
§ 371 (c)(1),
(2), (4) Date: Apr. 18, 2012

(87) PCT Pub. No.: WO2011/049162
PCT Pub. Date: Apr. 28, 2011

(65) Prior Publication Data
US 2012/0214911 A1 Aug. 23, 2012

(30) Foreign Application Priority Data
Oct. 23, 2009 (JP) .................. 2009-244804

(51) Int. Cl.
*C08L 1/08* (2006.01)
*C08L 23/02* (2006.01)
(Continued)

(52) U.S. Cl.
CPC .................. *C08L 23/02* (2013.01); *C08L 15/00* (2013.01); *C08L 23/10* (2013.01); *C08L 79/00* (2013.01); *C08K 7/02* (2013.01); *C08L 97/02* (2013.01)

(58) Field of Classification Search
None
See application file for complete search history.

(56) References Cited

U.S. PATENT DOCUMENTS

2006/0258810 A1  11/2006  Sugiura et al.
2008/0146701 A1  6/2008  Sain et al.
(Continued)

FOREIGN PATENT DOCUMENTS

EP    1250995 A1    10/2002
JP    08-073545 A    3/1996
(Continued)

OTHER PUBLICATIONS

Gonzalez-Sanchez et al., "Comparison of the Effects of Polyethylenimine and Maleated Polypropylene Coupling Agents on the Properties of Cellulose-Reinforced Polypropylene Composites," J. Appl. Poly. Sci., vol. 110, 2555-2562 (2008).*
(Continued)

*Primary Examiner* — Ling Choi
*Assistant Examiner* — Catherine S Branch
(74) *Attorney, Agent, or Firm* — Locke Lord LLP; James E. Armstrong, IV; Nicholas J. DiCeglie, Jr.

(57) ABSTRACT

This invention provides a polyolefin-based molded article containing microfibrillated plant fibers having high strength and high elastic modulus. Specifically, the present invention provides a composition comprising (1) a polymeric compound having a primary amino group, (2) a polymeric compound modified with maleic anhydride, (3) microfibrillated plant fibers, and (4) a polyolefin; and a molded article obtained by subjecting the composition to heat treatment.

17 Claims, 3 Drawing Sheets

(51) Int. Cl.
*C08L 15/00* (2006.01)
*C08L 23/10* (2006.01)
*C08L 79/00* (2006.01)
*C08L 97/02* (2006.01)
*C08K 7/02* (2006.01)

(56) References Cited

U.S. PATENT DOCUMENTS

| | | | |
|---|---|---|---|
| 2009/0065975 A1 | 3/2009 | Sain et al. | |
| 2009/0297819 A1 | 12/2009 | Yano et al. | |
| 2010/0151527 A1 | 6/2010 | Endo et al. | |
| 2012/0142532 A1* | 6/2012 | Wright et al. | 504/144 |

FOREIGN PATENT DOCUMENTS

| | | |
|---|---|---|
| JP | 2003-261703 A | 9/2003 |
| JP | 2005-187524 A | 7/2005 |
| JP | 2006-016418 A | 1/2006 |
| JP | 2008-169344 A | 7/2008 |
| JP | 2008-260887 A | 10/2008 |
| JP | 2008-274247 A | 11/2008 |
| JP | 2009-019200 A | 1/2009 |
| JP | 2009-516032 A | 4/2009 |
| WO | WO-2005/113667 A1 | 12/2005 |
| WO | WO-2007056839 A1 | 5/2007 |

OTHER PUBLICATIONS

Lu et al., "Chemical Coupling in Wood Fiber and Polymer Composites: A Review of Coupling Agents and Treatments," Wood and Fiber Science, 32 (1), pp. 88-104 (2000).*
Mai et al., "Effect of cold extrusion and heat treatment on the mechanical properties of polypropylene," Materiaux et Construction, vol. 15, Issue 2, pp. 99-106 (1982).*
Supplementary European Search Report dated Feb. 13, 2013, issued for the European patent application No. 10825011.9.
International Search Report dated Nov. 16, 2010, issued for PCT/JP2010/068565.

* cited by examiner

COMPOSITION CONTAINING MICROFIBRILLATED PLANT FIBERS

TECHNICAL FIELD

The present invention relates to a composition comprising microfibrillated plant fibers, and a molded article obtained by subjecting the composition to heat treatment.

BACKGROUND ART

It is widely known (for example, Patent Literature 1 and the like) that maleic acid-modified polypropylene (hereinafter sometimes abbreviated as "MAPP") is used as a compatibilizer or an interface-reinforcing agent in composite materials comprising cellulose-based microfibrillated plant fibers and polyolefins such as polypropylene (hereinafter sometimes abbreviated as "PP").

Additionally, the Examples of Patent Literature 2 disclose a composite material obtained from microfibrillated plant fibers containing lignin, PP, and MAPP. Further, the Examples of Patent Literature 3 disclose a composite material comprising lignocellulosic fibers, PP, and MAPP. In these composite materials, MAPP and lignin presumably function as interface reinforcing agents between PP and microfibrillated plant fibers, or between lignocellulosic fibers. However, because polyolefins such as PP are usually highly hydrophobic, when such a material is mixed with plant fibers mainly comprising highly hydrophilic cellulose, the uniform dispersibility and the interfacial interaction between these components are not sufficient even with the above methods, and it has been difficult to obtain a molded article with high strength.

CITATION LIST

Patent Literature

PLT 1: US Patent Publication No. US2008/0146701
PLT 2: Japanese Unexamined Patent Publication No. 2009-19200
PLT 3: Japanese Unexamined Patent Publication No. 2009-516032

SUMMARY OF INVENTION

Technical Problem

A main object of the present invention is to provide a polyolefin-based molded article having high strength and high elastic modulus, which comprises microfibrillated plant fibers.

Solution to Problem

As a result of extensive studies to solve the above problem, the present inventors found that it is possible to obtain a polyolefin-based molded article having high strength and high elastic modulus by using a polymeric compound modified with maleic anhydride in combination with an amine-based polymeric compound having a primary amino group in a polyolefin-based molded article containing microfibrillated plant fibers. The present invention was completed based on such a finding, and further extensive studies. Specifically, the present invention provides compositions recited in Items 1 to 9 below, and molded articles obtained by subjecting the compositions to heat treatment.

Item 1. A composition comprising:
(1) a polymeric compound having a primary amino group;
(2) a polymeric compound modified with maleic anhydride;
(3) microfibrillated plant fibers; and
(4) a polyolefin.

Item 2. The composition according to Item 1, wherein the polymeric compound modified with maleic anhydride is a maleic anhydride-modified polyolefin.

Item 3. The composition according to Item 1 or 2, wherein the maleic anhydride-modified polyolefin is maleic anhydride modified polypropylene, and the polyolefin is polypropylene.

Item 4. The composition according to any one of Items 1 to 3, wherein the polymeric compound having a primary amino group is at least one member selected from the group consisting of a compound having a repeating unit represented by the following Formula (A),

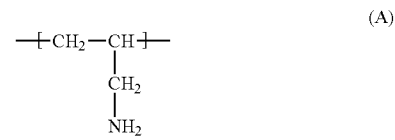

a compound having a repeating unit represented by the following Formula (B),

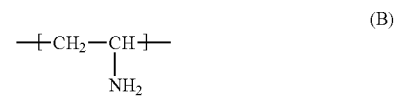

a polyethyleneimine compound having a repeating unit represented by the following Formula (C),

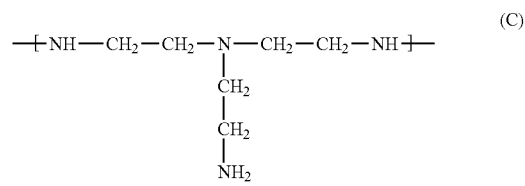

and salts thereof.

Item 5. A molded article obtained by subjecting the composition according to any one of Items 1 to 4 to heat treatment at 100 to 300° C.

Item 6. The molded article according to Item 5, containing 20 to 65% by mass of the microfibrillated plant fibers in the solids, and the tensile strength measured in accordance with a test method specified in JIS K-7113 (Test Method for Tensile Properties of Plastics) is 58 MPa or higher.

Item 7. A method for producing the composition according to any one of Items 1 to 4, comprising kneading
(1) a polymeric compound having a primary amino group,
(2) a polymeric compound modified with maleic anhydride,
(3) microfibrillated plant fibers, and
(4) a polyolefin.

Item 8. A method for producing the composition according to any one of Items 1 to 4, comprising the steps of defiberizing raw material pulp; and adding (1) a polymeric compound having a primary amino group, (2) a polymeric compound modified with maleic anhydride, and (4) a polyolefin to (3) microfibrillated plant fibers obtained in the preceding step, and stirring the mixture.

Item 9. A method for producing a molded article, comprising subjecting the composition obtained by the production method according to Item 7 or 8 to heat treatment at 100 to 300° C.

Advantageous Effects of Invention

In the present invention, the polyolefin-based molded article comprising microfibrillated plant fibers contains the amine-based polymeric compound containing a primary amino group (1) and the polymeric compound modified with maleic anhydride (2), thereby allowing uniform dispersion of each component in the molded article, in particular, highly hydrophilic microfibrillated plant fibers and highly hydrophobic polyolefin. This allows improvement in the binding strength between microfibrillated plant fibers as well as in the interfacial adhesion strength between microfibrillated plant fibers and polyolefin, thus producing a polyolefin-based molded article having high strength and high elastic modulus. Therefore, according to the present invention, the replacement of glass fibers in existing glass fiber-reinforced polyolefins with microfibrillated plant fibers is expected to result in reduced weight, higher strength, reduced thickness, smaller amount of incineration ash during disposal, and the like.

DESCRIPTION OF EMBODIMENTS

Figure 1:
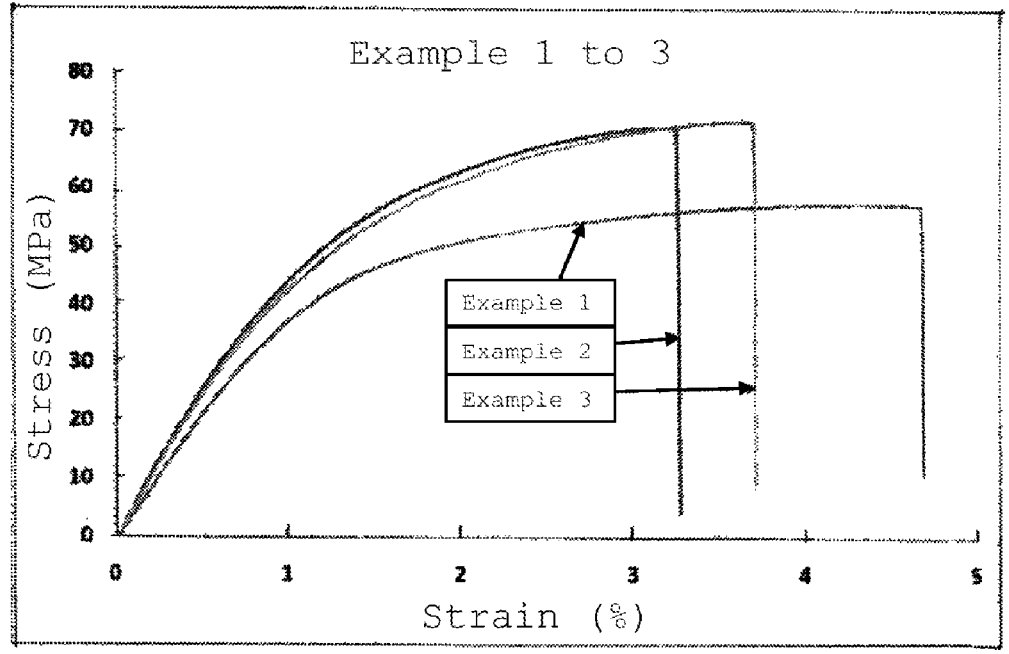
FIG. 1 A graph showing the strength and elastic modulus of the molded articles obtained in Examples 1 to 3.
Figure 2:
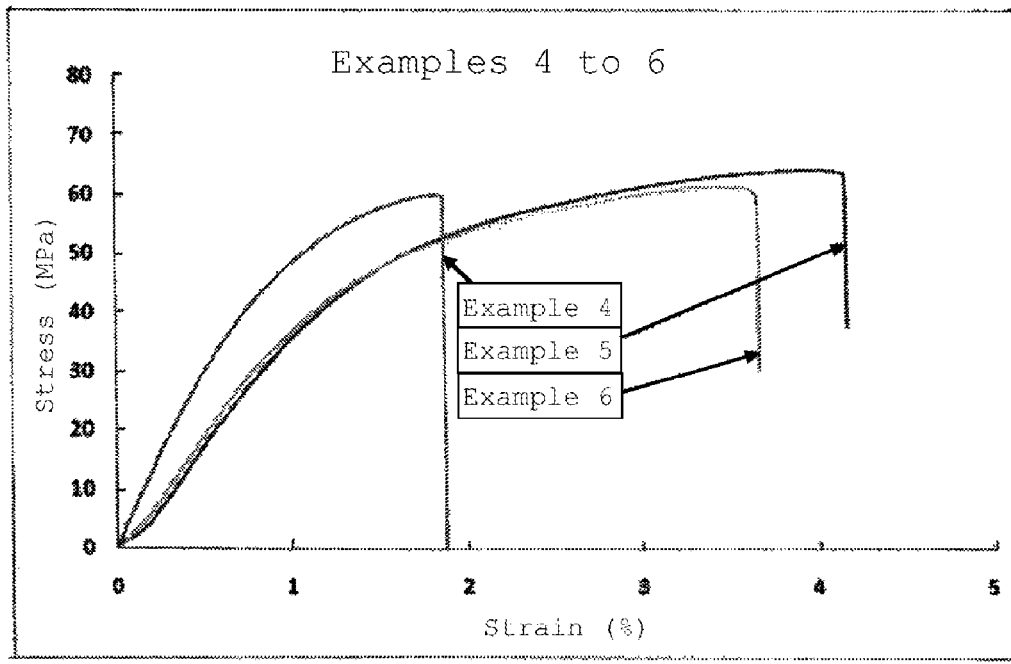
FIG. 2 A graph showing the strength and elastic modulus of the molded articles obtained in Examples 4 to 6.
Figure 3:
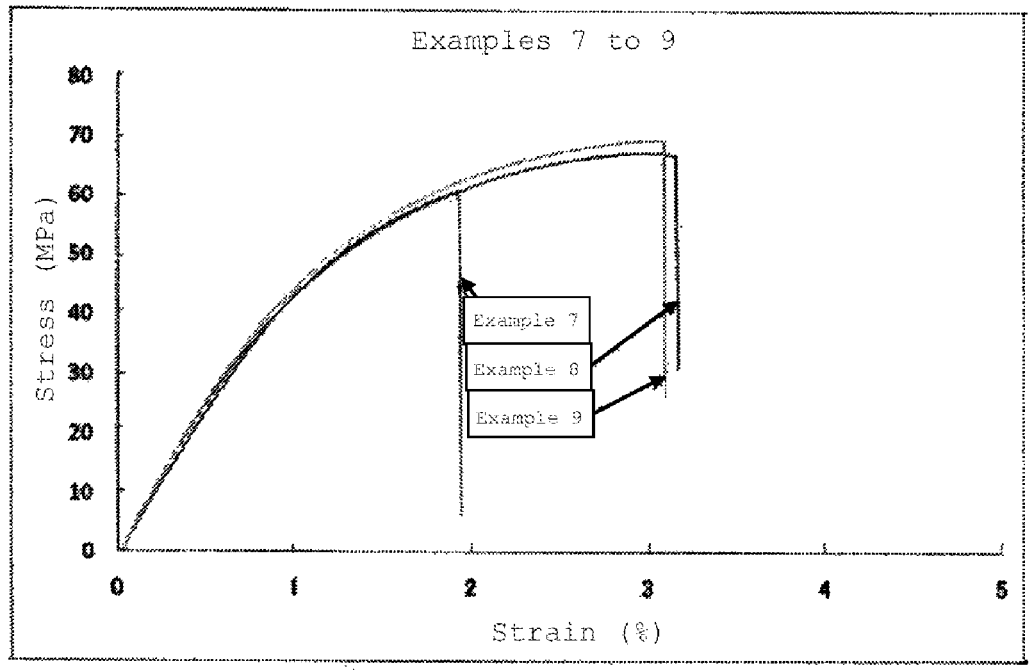
FIG. 3 A graph showing the strength and elastic modulus of the molded articles obtained in Examples 7 to 9.
Figure 4:
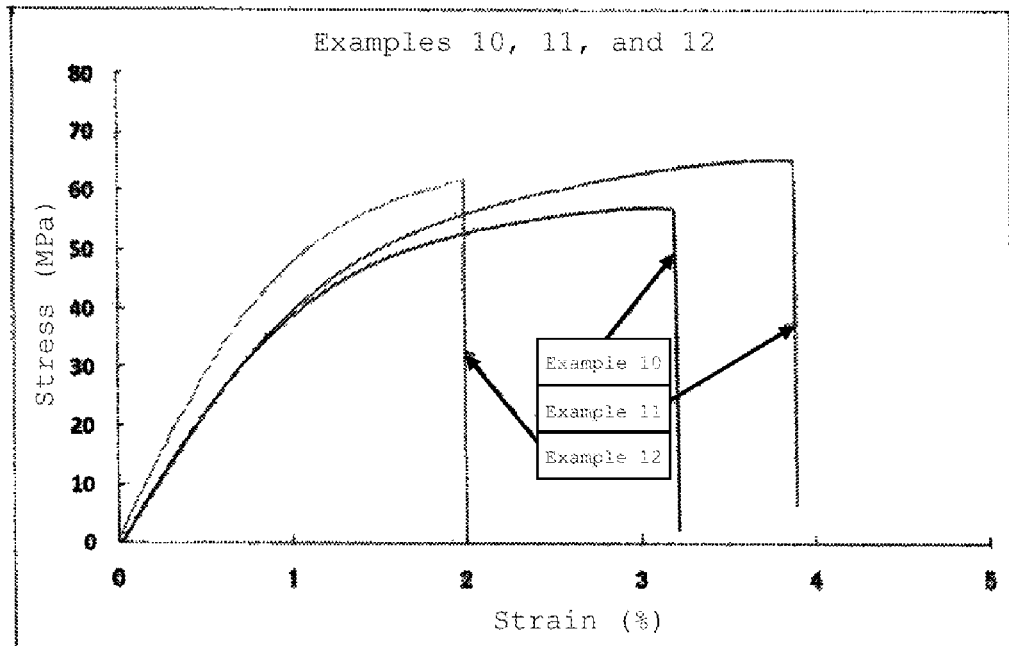
FIG. 4 A graph showing the strength and elastic modulus of the molded articles obtained in Examples 10 to 12.
Figure 5:
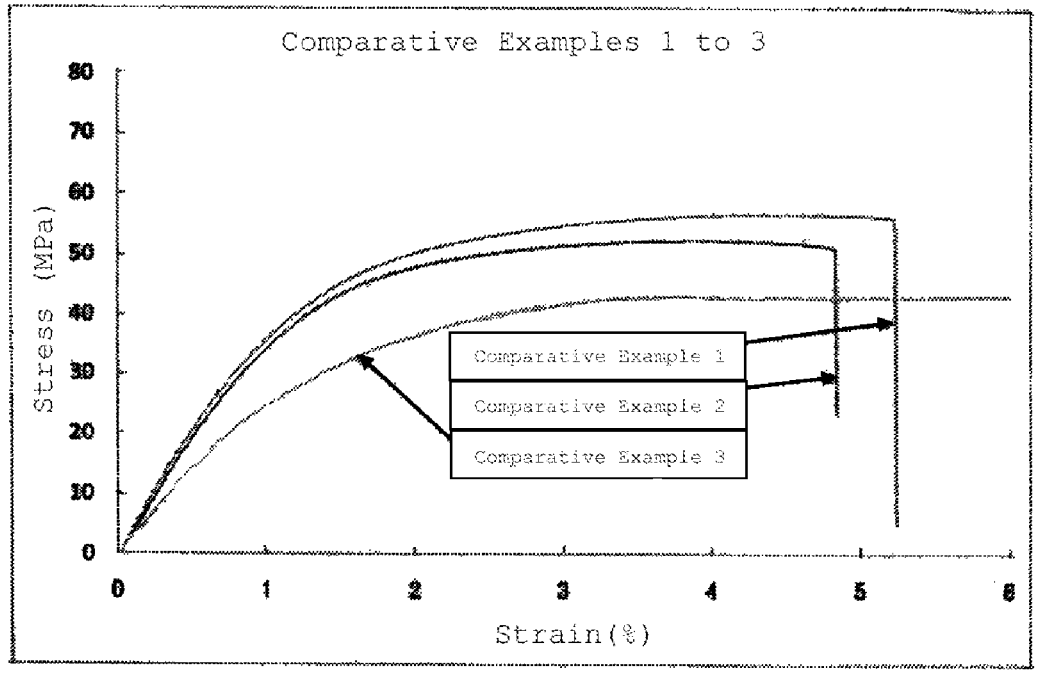
FIG. 5 A graph showing the strength and elastic modulus of the molded articles obtained in Comparative Examples 1 to 3.
Figure 6:
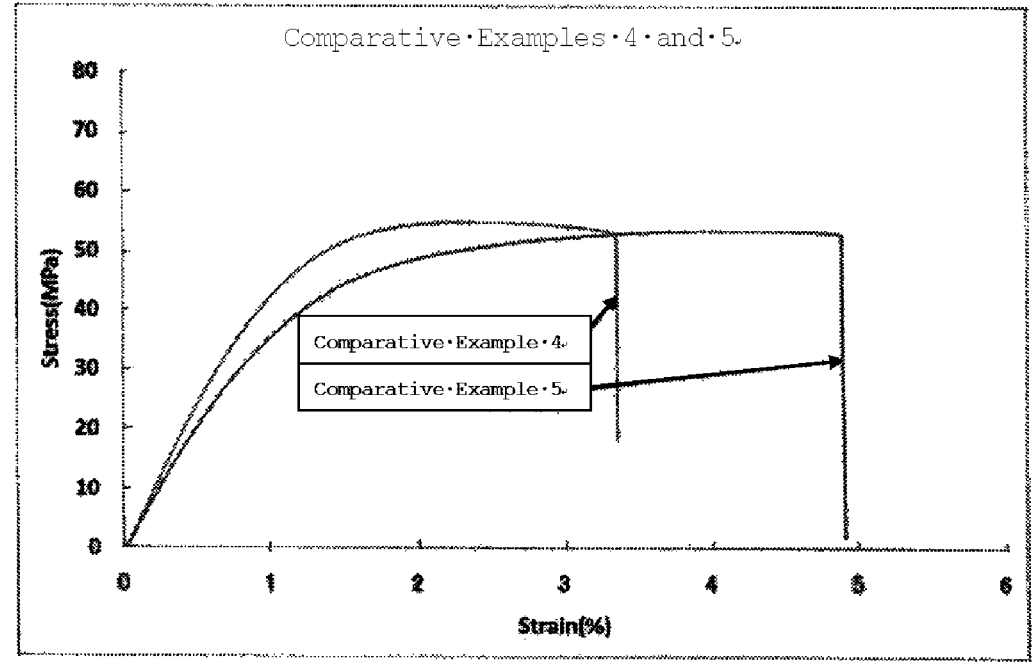
FIG. 6 A graph showing the strength and elastic modulus of the molded articles obtained in Comparative Examples 4 and 5.

The composition, molded article, and production methods thereof of the present invention are described in detail below.

1. Composition

The composition of the present invention is characterized by comprising
(1) a polymeric compound having a primary amino group,
(2) a polymeric compound modified with maleic anhydride,
(3) microfibrillated plant fibers, and
(4) a polyolefin.

(1) Polymeric Compound Having a Primary Amino Group

In the composition of the present invention, it is important that the composition contains a polymeric compound having a primary amino group in the molecule.

The weight-average molecular weight of the polymeric compound having a primary amino group is usually about 1,000 to 1,000,000 and preferably about 1,200 to 700,000.

In the present invention, the weight-average molecular weight is a value measured by any of the following methods: gel permeation chromatography (GPC) method (PEG standards); GPC method (Pullulan standards); and GPC-MALLS, in which a multi-angle light-scattering detector is connected to CPG columns.

The amino group in the polymeric compound having a primary amino group may form a salt with an organic or inorganic acid. Examples of inorganic acids with which the amino group may form a salt include hydrochloric acid, sulfuric acid, phosphoric acid, boric acid, hydrobromic acid, hydroiodic acid, and the like. Examples of organic acids include formic acid, acetic acid, propionic acid, p-toluenesulfonic acid, methanesulfonic acid, citric acid, tartaric acid, and the like. Further, the polymeric compound having a primary amino group may be used singly, or in a combination of two or more thereof. The polymeric compound having a primary amino group may be synthesized by a known method, or a commercially available product may be used.

Examples of the polymeric compound having a primary amino group include a compound having an allylamine unit represented by the following Formula (A) as a repeating unit

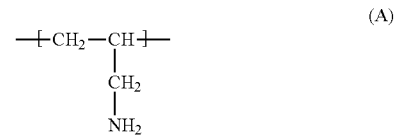

(A)

and a salt thereof.

The compound having a repeating unit represented by Formula (A) may be a copolymer or a graft polymer having a different repeating unit other than the repeating unit represented by Formula (A).

Examples of different repeating units that bind to the repeating unit represented by Formula (A) to form copolymers and graft polymers include units such as a polyacrylate unit; a polymethacrylate unit; a polyacrylamide unit; units containing a secondary amine such as a polydiallylamine unit; units containing a tertiary amine such as a polymethyldiallylamine unit; and units containing a quaternary ammonium salt such as a polydiallyldimethylammonium salt unit. The sequential order of each repeating unit is not limited. The repeating units may be arranged randomly or in blocks.

However, it is not preferable when there are too many repeating units other than the repeating unit represented by Formula (A), because the number of primary amino groups per unit weight is decreased. The compound having a repeating unit represented by Formula (A) is preferably a homopolymer consisting of the repeating unit represented by Formula (A) or a salt thereof.

The weight-average molecular weight of the compound having a repeating unit represented by Formula (A) is the same as described above.

Examples of salts of the compound having a repeating unit represented by Formula (A) include inorganic acid salts such as hydrochloride, sulfate, phosphate, hydrobromate, and hydriodide; and organic acid salts such as formate, acetate, propionate, p-toluenesulfonate, methanesulfonate, citrate, and tartrate. The compound having a repeating unit represented by Formula (A) can be synthesized by a known polymerization method using allylamine or the like as a starting material, and a commercially available product is also easily available.

Further, the polymeric compound having a primary amino group also encompasses, for example, a compound having a vinylamine unit represented by the following Formula (B) as a repeating unit

and a salt thereof.

The compound having a repeating unit represented by Formula (B) may be a copolymer or a graft polymer having a different repeating unit other than the repeating unit represented by Formula (B).

Examples of different repeating units that bind to the repeating unit represented by Formula (B) to form copolymers and graft polymers include units such as a polyacrylate unit; a polymethylmethacrylate unit; a polyacrylamide unit; units containing a secondary amine such as a polyvinylformamide unit, a polyvinylacetamide unit, and a polydiallylamine unit; units containing a tertiary amine such as a polymethyldiallylamine unit; and units containing a quaternary ammonium salt such as a polydiallyldimethylammonium salt unit. The sequential order of each repeating unit is not limited. The repeating units may be arranged randomly or in blocks.

However, it is not preferable when there are too many repeating units other than the repeating unit represented by Formula (B), because the number of primary amino groups per unit weight is decreased. The compound having a repeating unit represented by Formula (B) is preferably a homopolymer consisting of the repeating unit represented by Formula (B), or a salt thereof.

The weight-average molecular weight of the compound having a repeating unit represented by Formula (B) is the same as described above.

Examples of salts of the compound having a repeating unit represented by Formula (B) include inorganic acid salts such as hydrochloride, sulfate, phosphate, hydrobromate, and hydriodide; and organic acid salts such as formate, acetate, propionate, p-toluenesulfonate, methanesulfonate, citrate, and tartrate.

The compound having a repeating unit represented by Formula (B) can be synthesized, for example, by a known polymerization method such as hydrolyzing polymers of N-substituted amides such as N-vinylformamide and N-vinylacetamide, or modifying polyacrylamide by Hofmann degradation. A commercially available product is also readily available.

Further, the polymeric compound having a primary amino group also encompasses, for example, a compound having a repeating unit represented by the following Formula (C)

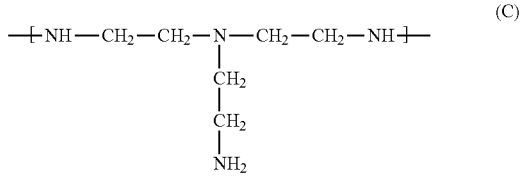

and a salt thereof.

In regard to the compound having a repeating unit represented by Formula (C), the repeating unit represented by Formula (C) may extend linearly, or may have a branched structure. Further, the compound may be a graft polymer having a different repeating unit other than the repeating unit represented by Formula (C).

It is not preferable when there are too many repeating units other than the repeating unit represented by Formula (C), because the number of primary amino groups per unit weight is decreased. The compound having a repeating unit represented by Formula (C) is preferably a homopolymer consisting of the repeating unit represented by Formula (C), or a salt thereof. Examples of such a preferable homopolymer or a salt thereof include polyethyleneimine or a salt thereof.

The weight-average molecular weight of the compound having a repeating unit represented by Formula (C) is the same as described above.

Examples of salts of the compound having a repeating unit represented by Formula (C) include inorganic acid salts such as hydrochloride, sulfate, phosphate, hydrobromate, and hydriodide; and organic acid salts such as formate, acetate, propionate, p-toluenesulfonate, methanesulfonate, citrate, and tartrate.

The compound having a repeating unit represented by Formula (C) is known as a cationic polymer, and can be synthesized by a known polymerization method using aziridine as a starting material. A commercially available product is also easily available.

The composition of the present invention preferably contains at least one selected from the group consisting of the compounds having the repeating units represented by Formulae (A), (B) and (C), and salts thereof.

In the composition of the present invention, the content of the polymeric compound having a primary amino group is usually about 1 to 30 parts by mass, preferably about 5 to 30 parts by mass, and particularly preferably about 7 to 15 parts by mass relative to 100 parts by mass of the microfibrillated plant fibers (3), which are described later.

(2) Polymeric Compound Modified with Maleic Anhydride

In the composition of the present invention, it is important that the composition contains a polymeric compound modified with maleic anhydride, in addition to the polymeric compound having a primary amino group in the molecule.

A usable polymeric compound modified with maleic anhydride usually have a molecular weight of about 30,000 to 100,000, and preferably about 50,000 to 100,000, in terms of weight-average molecular weight. Further, the polymeric compound modified with maleic anhydride may be used singly, or in a combination of two or more thereof. The polymeric compound modified with maleic anhydride may be synthesized by a known method, or a commercially available product may be used.

A maleic anhydride-modified polyolefin is preferable as a polymeric compound modified with maleic anhydride. Examples of maleic anhydride-modified polyolefins include maleic anhydride-modified polyethylene, maleic anhydride modified-polypropylene, maleic anhydride-modified polybutadiene, maleic anhydride-modified polystyrene, maleic anhydride-modified polymethacrylate, and the like. Examples thereof also include straight-chain olefins such as ethylene, propylene, 1-butene, 1-pentene, 1-hexene, and the like; branched olefins such as 3-methyl-1-butene, 3-methyl-1-pentene, 4-methyl-1-pentene, and the like; and maleic anhydride modified copolymers of butadiene, styrene, and the like.

It is preferable that the polymeric compound modified with maleic anhydride usually has a skeleton similar to that of the polyolefin (4), which is described later. Specifically, for example, when polypropylene is used as the polyolefin (4), it is particularly preferable that maleic anhydride modified polypropylene is used as the polymeric compound modified with maleic anhydride (2).

The percentage of maleic anhydride-modification in the polymeric compound modified with maleic anhydride is usually about 1% to 10% by mass, and preferably about 3% to 5% by mass.

In the composition of the present invention, the content of the polymeric compound modified with maleic anhydride is usually about 4 to 50 parts by mass, preferably about 6 to 15 parts by mass, and particularly preferably about 10 to 15 parts by mass, relative to 100 parts by mass of the microfibrillated plant fibers (3).

In the present invention, the polymeric compound having a primary amino group (1) is believed to reinforce the network structure between the microfibrillated plant fibers (3) by binding, via hydrogen bonding, to hydroxyl groups derived from cellulose or hemicellulose present on the surface of the microfibrillated plant fibers (3), and by interacting, via electrostatic interaction, with carboxyl groups that are sparsely present. The polymeric compound (1) is also believed to reinforce the interface between the microfibrillated plant fibers (3) and the polyolefin (4) by reacting and interacting with the anhydride ring of the polymeric compound modified with maleic anhydride (2). Accordingly, it is usually preferable that the number of primary amino groups in the composition is greater than the number of maleic anhydride groups.

(3) Microfibrillated Plant Fibers

The microfibrillated plant fibers contained in the composition of the present invention are known, and are usually produced by the following method: a cellulose fiber-containing material is ground or beaten using a refiner, a twin-screw kneader (twin-screw extruder), a high-pressure homogenizer, a medium stirring mill, a stone mill, a grinder, a vibrating mill, a sand grinder, or the like; and is thereby defibrated or refined. The microfibrillated plant fibers can also be produced in accordance with other known methods, such as the one disclosed in Japanese Unexamined Patent Publication No. 2005-42283. Further, commercially available products can also be used.

Known cellulose fiber-containing materials include those obtained from plants (e.g., wood, bamboo, hemp, jute, kenaf, waste of agricultural land, cloth, pulp (needle unbleached kraft pulp (NUKP), needle bleached kraft pulp (NBKP), leaf unbleached kraft pulp (LUKP), leaf bleached kraft pulp (LBKP), needle unbleached sulfite pulp (NUSP), needle bleached sulfite pulp (NBSP), thermo-mechanical pulp (TMP), regenerated pulp, used paper, and the like); animals (e.g., Ascidiacea); algae, microorganisms (e.g., acetic acid bacteria (acetobacter)); microorganism products; and the like. Any of those can be used in the present invention, with plant- or microbially derived cellulose fibers being preferable, and plant-derived cellulose fibers being more preferable. Of plant-derived cellulose fibers, pulp (in particular, needle unbleached kraft pulp (NUKP) and needle bleached kraft pulp (NBKP)) are particularly preferable.

In the present invention, the average fiber diameter of the microfibrillated plant fibers is preferably 4 nm to 50 μm, more preferably 4 nm to 10 μm, and even more preferably 4 nm to 1,000 nm.

Further, the microfibrillated plant fibers are fibers whose fiber length is very long relative to the fiber diameter. Although it is difficult to determine the fiber length, the average fiber length is preferably at least 5 times, more preferably at least 10 times, and even preferably at least 20 times the fiber diameter.

Further, in the present invention, the microfibrillated plant fibers may be those treated with an alkaline solution (e.g., aqueous alkaline solutions such as sodium hydroxide and potassium hydroxide, and aqueous ammonia). Additionally, the microfibrillated plant fibers may be obtained by the following manner: a cellulose fiber-containing material is formed using a refiner or the like into a shape (e.g., power, fibrous, or sheet-like form) that allows efficient alkali solution treatment, if necessary; the material is treated with an alkaline solution; and the treated material is ground and/or beaten by known defibration or refining technique used in the production of microfibrillated plant fibers, usually using a refiner, a high-pressure homogenizer, a medium stirring mill, a stone mill, a grinder, or the like.

In the composition of the present invention, the content of microfibrillated plant fibers is usually about 1% to 90% by mass, and preferably about 5% to 80% by mass relative to the total mass of the composition.

(4) Polyolefin

In the composition of the present invention, a polyolefin as a main ingredient may be a known polyolefin. Examples of polyolefins include linear α-olefins such as ethylene, propylene, 1-butene, 1-pentene, and 1-hexene; branched olefins such as 3-methyl-1-butene, 3-methyl-1-pentene, and 4-methyl-1-pentene; homopolymers or copolymers of styrene, butadiene, isoprene, chloroprene, isobutylene, isoprene, and the like; cyclic polyolefins having a norbornene skeleton; and the like.

The weight-average molecular weight of the polyolefin is usually about 100,000 to 400,000, and preferably about 200,000 to 300,000. Further, the polyolefin may be used singly, or in a combination of two or more thereof. The polyolefin may be synthesized by a known method, or a commercially available product may be used.

In the composition of the present invention, the content of the polyolefin is usually about 2 to 98 parts by mass, and preferably about 5 to 95 parts by mass relative to 100 parts by mass of the microfibrillated plant fibers (3).

Further, in the composition of the present invention, the content of the polyolefin is usually about 1% to 99% by mass, and preferably about 2% to 98% by mass in the total mass of the composition.

In addition to a polymeric compound having a primary amino group (1), a polymeric compound modified with maleic anhydride (2), microfibrillated plant fibers (3), and a polyolefin (4), the composition of the present invention may contain other components if necessary. Examples of other components include water; alkalis such as sodium hydroxide, potassium hydroxide, magnesium hydroxide, and calcium hydroxide; inorganic fillers such as clay, talc, calcium carbonate, mica, titanium dioxide, and zinc oxide; organic fillers such as carbon black, graphite, and glass flakes; dyes or pigments such as red iron oxide, azo pigment, and phthalocyanine; and various additives such as modifying additives including dispersants, lubricants, plasticizers, release agents, fire retardants, antioxidants (phenolic antioxidants, phosphorylation inhibitors, sulfur-based antioxidants), antistatic agents, light stabilizers, ultraviolet absorbers, metal deactivators, crystallization promoting agents (nucleating agents), foaming agents, crosslinking agents, antibacterial agents, and the like.

In the present invention, the amine-based polymeric compound containing a primary amino group (1) and the polymeric compound modified with maleic anhydride (2) are used and mixed together, thereby allowing the microfibrillated plant fibers and the polyolefin to be uniformly dispersed in the composition. Further, by applying heat treatment to the composition in which each component is uniformly dispersed, it is possible, as described later, to obtain a molded article containing microfibrillated plant fibers having high strength and high elastic modulus. In other words, the composition of the present invention is useful as a starting material of microfibrillated plant fiber-containing resin.

2. Method for Producing the Composition of the Present Invention

The production method of the composition of the present invention is not particularly limited as long as the polymeric compound having a primary amino group (1), the polymeric compound modified with maleic anhydride (2), the microfibrillated plant fibers (3), the polyolefin (4), and other components (if necessary) are mixed together. The mixing order of the components (1) to (4) and other components is not particularly limited.

Further, the method for mixing the components (1) to (4) and other components is not particularly limited. A known method can be employed. For example, each of the components (1) to (4) and other components can be uniformly dispersed by kneading these components by a twin-screw extruder (twin-screw kneader) or the like. As described above, in the present invention, the amine-based polymeric compound containing a primary amino group (1) and the polymeric compound modified with maleic anhydride (2) are used and mixed together, thereby allowing each component contained in the composition of the present invention to be uniformly dispersed. The temperature during mixing of each component is also not particularly limited, and is usually about 0 to 300° C.

The composition of the present invention can be obtained by, for example, defiberizing pulp or the like as a starting material of the microfibrillated plant fibers by a twin-screw extruder or the like; adding the components (1), (2), and (4) and other components (such as water) that are used, if necessary, to the pulp; and stirring the mixture. Alternatively, the components (1), (2), and (4) and other components that are used, if necessary, may be mixed together when producing the microfibrillated plant fibers by defiberizing pulp or the like by a refiner, a twin-screw extruder, or the like, thereby producing the microfibrillated plant fibers by defiberization of a cellulose fiber-containing material, and stirring each component at the same time.

3. Molded Article

As described later, the molded article of the present invention is obtained by subjecting the composition of the present invention to heat treatment.

The temperature for heat treatment is preferably equal to or greater than the melting point of the polyolefin (4) contained in the composition.

As described above, in the present invention, the amine-based polymeric compound containing a primary amino group (1) and the polymeric compound modified with maleic anhydride (2) are used and mixed together, and the microfibrillated plant fibers and the polyolefin can thereby be uniformly dispersed in the composition. It is also possible to improve both of the binding strength between the microfibrillated plant fibers and the interfacial adhesion strength between the highly hydrophilic microfibrillated plant fibers and the highly hydrophobic polyolefin. In the present invention, a polyolefin-based molded article having high strength and high elastic modulus can be obtained by applying heat treatment to the composition in which each of these components is uniformly dispersed.

Further, in the molded article of the present invention, a primary amino group in the component (1) is considered to partially or completely react with and bind to carboxyl groups present at the maleic anhydride site in the component (2) and on the surface of the microfibrillated plant fibers (3). These bonds are believed to contribute to the improvement in the strength and elastic modulus of the resin material.

Accordingly, the replacement of glass fibers in existing glass fiber-reinforced polyolefins with microfibrillated plant fibers is expected to result in reduced weight, higher strength, reduced thickness, smaller amount of incineration ash during disposal, and the like.

The tensile strength of the molded article of the present invention is usually 58 MPa or higher when the molded article contains 20% to 65% by mass of the microfibrillated plant fibers. Further, the tensile elastic modulus of the molded article of the present invention is usually 3.5 GPa or higher.

When the composition of the present invention contains almost no components that are vaporized by the heat treatment, the amount of each component contained in the composition before the heat treatment is substantially the same as the amount of each component contained in the molded article after the heat treatment. In other words, the amount of each component in the molded article of the present invention is the same as the content of each component in the composition.

In the present invention, the tensile strength is a value measured using a test piece No. 2 (dumbbell shape, 1 mm in thickness) in accordance with JIS K-7113 (Test Method for Tensile Properties of Plastics). In addition, the tensile elastic modulus is a value measured using an Instron 3365 universal testing machine (produced by Instron Japan Company Limited).

4. Method for Producing the Molded Article

The molded article of the present invention is obtained by subjecting the composition of the present invention to heat treatment. The temperature for the heat treatment (treatment including heating, melting, kneading, and the like) to the composition of the present invention is usually about 100 to 300° C., preferably about 110 to 250° C., and particularly preferably about 120 to 220° C. A molded article obtained by the heat treatment can be molded into a desired shape by a known resin molded article.

For example, after the composition is heated, melted, kneaded, and pelletized by a pelletizer or the like, the thus-obtained pellet is subjected to injection molding, mold molding, or the like, thereby molding the composition into a desired shape.

As a molding method, any method similar to common molding methods of thermoplastic resin compositions can be employed. For example, methods such as injection molding, mold molding, extrusion molding, blow molding, foam molding, and the like can be employed.

The molded article of the present invention is lighter and stronger than conventionally used glass fiber reinforced materials, and can therefore be used in, for example, housings of home electric appliances such as computers and cellular phones. The article can also be used in office equipment such as stationery, products for daily use such as furniture, sporting goods, automobile interiors such as dashboards, luggage compartments in airplanes, structural members for transportation equipment, construction materials such as sashes for houses, and the like. Further, because the article has excellent insulation properties, it is expected to be applicable to electrical, electronic, and communication equipment.

EXAMPLES

The present invention is described in further detail below with reference to Examples. However, the present invention is not limited thereto.

Example 1

As a compound having an allylamine unit, poly(allylamine hydrochloride) (PAA produced by Nitto Boseki Co., Ltd.;

product name: PAA-HCl-10L) was diluted with water to 5% by weight. Subsequently, the pH of the diluted solution was adjusted to 10 with sodium hydroxide. Next, the above aqueous solution, polypropylene (PP produced by Japan Polypropylene Corporation; product name: MA4AHB), and maleic acid-modified polypropylene (MAPP produced by Toyo Kasei Kogyo Co., Ltd.; product name: Toyotack H1000P; the content of maleic acid: 4% by mass; melt flow rate 100 (190° C., 2.16 kg)) were added to needle unbleached kraft pulp (NUKP produced by Oji Paper Co., Ltd.; concentration: 25%), and the mixture was stirred with a mixer for 10 minutes (the solids ratio (mass ratio) of each component is as follows: NUKP:PP:MAPP:PAA=30:63:3:4).

The thus-obtained mixture was fed to a twin-screw extruder (Technovel Corporation; a screw diameter of 15 mm), and NUKP was defiberized at the same time that NUKP, PP, MAPP, and PAA were mixed together. The rotation speed was 400/min., the defiberization speed was 400 g/hr., and the barrel temperature was 5 to 60° C.

The thus-obtained mixture of microfibrillated NUKP, PP, MAPP, and PAA was melted and kneaded (rotation speed: 200/min.; processing speed: 200 g/hr.; temperature: 160-180° C.) using the twin-screw extruder produced by Technovel Corporation (screw diameter: 15 mm). Subsequently, the mixture was pelletized using a pelletizer (produced by Technovel Corporation). Further, the thus-obtained pellet was fed to a mold injection machine (NPX7-1F produced by Nissei Plastic Industrial Co., Ltd.), thereby obtaining a dumbbell-shaped molding. The molding temperature was 200° C. Table 1 shows the tensile strength and the tensile elastic modulus of the resulting molding. The tensile strength and the tensile elastic modulus were measured by the method described above.

Examples 2 to 11 and Comparative Examples 1 to 6

In the same manner as in Example 1, a dumbbell-shaped molding was obtained from the polymeric compound having a primary amino group (component (1)), the polymeric compound modified with maleic anhydride (component (2)), the microfibrillated plant fibers (component (3)), and the polypropylene (component (4)) shown in Table 1. The mass ratio of each component is the same as that in Example 1. Tables 1 and 2 show the tensile strength and the tensile elastic modulus of the resulting molding.

Example 12

A dumbbell-shaped molding was obtained in the same manner as in Example 9, except that the mass ratio of component (1):component (2):component (3):component (4) was 20:75.3:2.7:2. Table 2 shows the tensile strength and the tensile elastic modulus of the resulting molding.

TABLE 1

| | Component (1) | | | | Component (2) | Component (3) | Component (4) | Tensile strength (MPa) | Tensile elastic modulus (GPa) |
|---|---|---|---|---|---|---|---|---|---|
| | Product name | Amine | Category | Molecular weight | | | | | |
| Example 1 | PAA | Primary amine | (A) | 150,000 | MAPP | Defiberized NUKP | PP | 60.6 | 4.33 |
| Example 2 | T-ND104 | Primary amine | (B) | 400,000 to 700,000 | MAPP | Same as above | Same as above | 70.3 | 4.84 |
| Example 3 | T-ND106 | Primary amine | (B) | 400,000 to 700,000 | MAPP | Same as above | Same as above | 71.8 | 4.58 |
| Example 4 | T-ND107 | Primary amine | (B) | 30,000 to 50,000 | MAPP | Same as above | Same as above | 59.8 | 3.90 |
| Example 5 | P-1000 | Mixture of primary, secondary, and tertiary amines | (C) | 70,000 | MAPP | Same as above | Same as above | 64.3 | 4.30 |
| Example 6 | SP-012 | Mixture of primary, secondary, and tertiary amines | (C) | 1,200 | MAPP | Same as above | Same as above | 61.5 | 4.38 |
| Example 7 | T-ND106 | Primary amine | (B) | 400,000 to 700,000 | MAPP | Same as above | HE-3040 | 60.5 | 4.56 |
| Comparative Example 1 | — | — | — | — | MAPP | Same as above | PP | 56.3 | 3.92 |
| Comparative Example 2 | PAS-21CL | Secondary amine | — | 110,000 | MAPP | Same as above | Same as above | 54.6 | 4.72 |
| Comparative Example 3 | — | — | — | — | — | — | Same as above | 44.2 | 2.65 |

In Table 1, PAA is a polymer having a repeating unit represented by Formula (A). T-ND104, 106, and 107 (produced by Seiko PMC Corporation) are polymers having a repeating unit represented by Formula (B), and the amounts of cations (representative values) in these polymers are 23 mol %, 94 mol %, and 23 mol %, respectively. P-1000 and SP-012 are polyethyleneimines (produced by Nippon Shokubai Co., Ltd.; trademark: Epomin) having a unit represented by Formula (C). PAS-21CL is polydiallylamine hydrochloride (produced by Nitto Boseki Co., Ltd.). HE-3040 is high-density polyethylene (produced by Sumitomo Seika Chemicals Co., Ltd.; trademark: Flow Beads). The same applies to Table 2.

The categories in Table 1 correspond to the compounds having repeating units represented by Formulae (A) to (C). The same applies to Table 2 below.

TABLE 2

| | Component (1) | | | | Component (2) | Component (3) | Component (4) | Tensile strength (MPa) | Tensile elastic modulus (GPa) |
|---|---|---|---|---|---|---|---|---|---|
| | Product name | Amine | Category | Molecular weight | | | | | |
| Example 8 | T-ND104 | Primary amine | (B) | 400,000 to 700,000 | MAPP | Defiberized NUKP | PP | 67.1 | 4.62 |
| Example 9 | T-ND106 | Primary amine | (B) | 400,000 to 700,000 | MAPP | Same as above | Same as above | 69.4 | 4.87 |
| Example 10 | P-1000 | Mixture of primary, secondary, and tertiary amines | (C) | 70,000 | MAPP | Same as above | Same as above | 66.0 | 4.42 |
| Example 11 | SP-012 | Mixture of primary, secondary, and tertiary amines | (C) | 1,200 | MAPP | Same as above | Same as above | 57.5 | 4.33 |
| Example 12 | T-ND106 | Primary amine | (B) | 400,000 to 700,000 | MAPP | Same as above | Same as above | 61.4 | 3.87 |
| Comparative Example 4 | KBE-903 | Primary amine | — | 221 | MAPP | Same as above | Same as above | 51.1 | 3.70 |
| Comparative Example 5 | — | — | — | — | MAPP | Same as above | Same as above | 56.1 | 4.00 |

In Table 2, KBE-903 is 3-aminopropyltriethoxysilane (produced by Shin-Etsu Chemical Co., Ltd.).

In particular, in Comparative Examples 1 and 3, in which a compound having a primary amino group was not added, the tensile strength was low compared to that in Examples 1 to 12. Further, when APS, which is a low-molecular compound having a primary amino group, was added, as in Comparative Example 4, the resulting product was inferior in both tensile strength and tensile elastic modulus. Additionally, when PAS-21CL, known as a cationic polymer having a secondary amino group, was used, the resulting product had poor tensile strength, as in Comparative Example 2. Further, in Comparative Examples 3 and 5, in which neither a polymeric compound having a primary amino group nor MAPP was added, the resulting products were inferior in both tensile strength and tensile elastic modulus.

The invention claimed is:

1. A composition comprising:
(1) a polymeric compound having a primary amino group;
(2) a polymeric compound modified with maleic anhydride;
(3) microfibrillated plant fibers; and
(4) a polyolefin,
wherein the polymeric compound having a primary amino group is at least one member selected from the group consisting of a compound having a repeating unit represented by the following Formula (A),

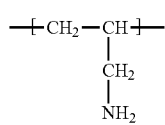

(A)

a compound having a repeating unit represented by the following Formula (B),

(B)

and salts thereof.

2. The composition according to claim 1, wherein the polymeric compound modified with maleic anhydride is a maleic anhydride-modified polyolefin.

3. The composition according to claim 1, wherein the maleic anhydride-modified polyolefin is maleic anhydride modified polypropylene, and the polyolefin is polypropylene.

4. A molded article obtained by subjecting the composition according to claim 1 to heat treatment at 100 to 300° C.

5. The molded article according to claim 4, containing 20 to 65% by mass of the microfibrillated plant fibers in the solids, and the tensile strength measured in accordance with a test method specified in JIS K-7113 (Test Method for Tensile Properties of Plastics) is 58 MPa or higher.

6. A method for producing the composition according to claim 1, comprising kneading
(1) a polymeric compound having a primary amino group,
(2) a polymeric compound modified with maleic anhydride,
(3) microfibrillated plant fibers, and
(4) a polyolefin.

7. A method for producing the composition according to claim 1, comprising the steps of
defiberizing cellulose fibers; and
adding (1) a polymeric compound having a primary amino group, (2) a polymeric compound modified with maleic anhydride, and (4) a polyolefin to (3) microfibrillated plant fibers obtained in the preceding step and stirring the mixture.

8. A method for producing a molded article, comprising subjecting the composition obtained by the production method according to claim 6 to heat treatment at 100 to 300° C.

9. The composition according to claim 2, wherein the maleic anhydride-modified polyolefin is maleic anhydride modified polypropylene, and the polyolefin is polypropylene.

10. A molded article obtained by subjecting the composition according to claim 2 to heat treatment at 100 to 300° C.

11. A molded article obtained by subjecting the composition according to claim 3 to heat treatment at 100 to 300° C.

12. A molded article obtained by subjecting the composition according to claim 9 to heat treatment at 100 to 300° C.

13. A method for producing the composition according to claim 2, comprising kneading
(1) a polymeric compound having a primary amino group,
(2) a polymeric compound modified with maleic anhydride,
(3) microfibrillated plant fibers, and
(4) a polyolefin.

14. A method for producing the composition according to claim 3, comprising kneading
(1) a polymeric compound having a primary amino group,
(2) a polymeric compound modified with maleic anhydride,
(3) microfibrillated plant fibers, and
(4) a polyolefin.

15. A method for producing the composition according to claim 2, comprising the steps of
defiberizing cellulose fibers; and
adding (1) a polymeric compound having a primary amino group, (2) a polymeric compound modified with maleic anhydride, and (4) a polyolefin to (3) microfibrillated plant fibers obtained in the preceding step and stirring the mixture.

16. A method for producing the composition according to claim 3, comprising the steps of
defiberizing cellulose fibers; and
adding (1) a polymeric compound having a primary amino group, (2) a polymeric compound modified with maleic anhydride, and (4) a polyolefin to (3) microfibrillated plant fibers obtained in the preceding step and stirring the mixture.

17. A method for producing a molded article, comprising subjecting the composition obtained by the production method according to claim 7 to heat treatment at 100 to 300° C.

* * * * *